United States Patent Office 3,147,465
Patented Sept. 1, 1964

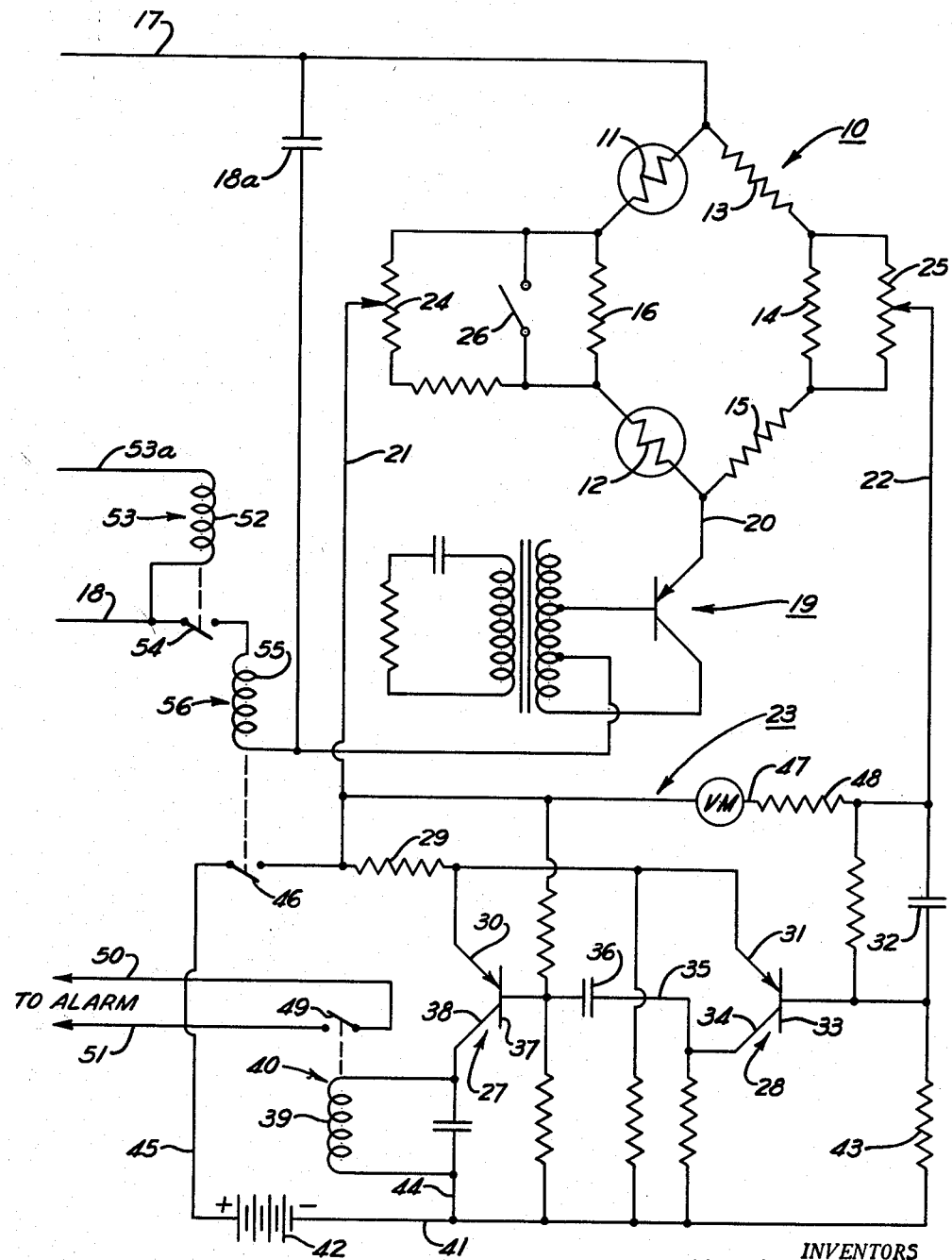

3,147,465
METHANE ALARM AND CONTROL SYSTEM
Harry Shaffer Brown, Murrysville, Daniel Andrew Green, Pittsburgh, and Edward Joseph Ross, White Oak, Pa., assignors to Mine Safety Appliances Company, a corporation of Pennsylvania
Filed Dec. 27, 1960, Ser. No. 78,691
3 Claims. (Cl. 340—237)

This invention relates to a system for detecting methane and acting automatically to operate an alarm and cut off electrical power circuits to a mining machine operating in the hazardous area.

The primary objects of the invention are to provide a device of this kind which is compact, inexpensive, reliable and extremely sensitive.

The invention utilizes an electrical bridge having two filaments, one exposed to the gas to be tested and the other in fresh air, as in the prior art. However, previously the bridge has been *balanced* electrically when in the fresh air condition, whereas in the present invention the bridge is then in an *unbalanced* condition. This change in connection with the use of pulsating bridge current permits more sensitive operation.

Current from the bridge network is carried to a relay-operating network which normally energizes a relay in an alarm-operated circuit. The parts are so constructed and arranged that a very small drop in current coming from the bridge circuit (due to action of methane on the detector filament) permits the contacts in the alarm circuit to open, thus operating the alarm devices.

To provide an economical and reliable relay-operating network there is used a transistorized flip-flop network. To permit using this flip-flop network the current powering the bridge network is passed through a transistorized blocking oscillator to produce a pulsating current.

The flip-flop network, therefore, receives pulsating current from the bridge network, and these pulses are collected and utilized to energize the holding coil of the alarm relay.

These, and other objects and advantages of the invention will become apparent as the description proceeds.

The drawing is a diagram illustrating the electrical components of the system.

The system comprises in general a detecting network and a relay-operating network. The detecting network will be described first.

Detecting Network

A major component of the detecting network is a hotwire electrical bridge indicated generally at 10. One arm of this bridge includes a "detector" filament 11 of a wellknown type which is catalytically active to methane and which is located in a duct subject to a stream of gas to be checked. A similar filament 12 is in fresh air and is called the "comparison filament."

Resistors 13, 14, 15 and 16 are placed in the arms of the bridge in a conventional manner.

Current (D.C.) is provided for the bridge over lines 17 and 18. A transistorized blocking oscillator 19 is interposed between line 18 and the bridge, and changes the steady D.C. to pulsating current. A large capacitor 18a (prefereably 100 m.f.) across lines 17 and 18 provides a shunt for the pulsating current, thus keeping most of the bridge energy within the bridge network.

The reason for supplying pulsating current to the bridge is to permit the use of a transistorized flip-flop network to receive the signal pulses from the bridge and cause them to operate a signal relay. At the present time it is not possible to build a transistorized D.C. amplifier at reasonable cost, because commercially available transistors are not leak proof and have poor thermal qualities. Nor can a suitable D.C. amplifier using tubes be built at a reasonable cost.

Since the construction of the blocking oscillator 19 is not new with the present inventors, it will not be described in detail.

Conductor 17 is connected to one corner of the bridge between resistor 13 and filament 11, and a conductor 20 connects the blocking oscillator to the opposite corner of the bridge.

Impulses from the bridge are carried by conductors 21 and 22 to the relay-operating network 23.

Conductor 21 is connected to the bridge by means of a variable resistor 24 which is in shunt with resistor 16. Similarly, conductor 22 is connected to the bridge through variable resistor 25 which is in shunt with resistor 14.

Since the filaments used in the bridge do not have absolutely uniform properties, means is provided to adjust the bridge for variations between filaments when a pair of new filaments 11 and 12 is installed. This means consists of a switch 26 which, when closed, cuts across resistor 24. With switch 26 closed, the resistor 25 is adjusted to balance the two sides of the bridge.

After this adjustment switch 26 is opened, and the bridge is then in unbalanced condition, due to the fact that there is now more resistance in the leg which includes filament 12 than in the leg which includes filament 11. The amount of this unbalance can be adjusted by moving the tap of the adjustable resistor 24.

The bride is normally in this unbalanced condition when the alarm system has been turned on but no methane is affecting the detector filament 11. Under this "fresh air" condition pulses of a certain strength are transmitted by way of conductors 21 and 22 to the receiving network, where they serve to hold closed a control relay. This control relay is the alarm relay 40, which will be subsequently described in greater detail.

When filament 11 is affected by methane it gets hotter and its increased resistance moves the electrical condition of the bridge toward a balanced condition, and if the methane concentration is sufficiently high, the bridge null circuit can change through zero to the opposite polarity.

This change of the electrical condition of the bridge toward a balanced condition reduces the amplitude of the pulses transmitted through conductors 21 and 22 to the receiving network. The parts are so designed and arranged that a very small decrease, near the null point, of the current coming from the bridge is sufficient to cause the alarm to operate. This renders the system extremely sensitive to small amounts of methane.

Receiving Network

As explained above, it is not possible in the present state of the transistor art to build at reasonable cost a transistorized D.C. amplifier. To withstand rugged usage in mines it is prefereable to use transistors in all stages of the system. Hence the receiving network includes a monostable pulse-operated flip-flop network which operates the alarm relay. Such a network can make use of presently-available commercial transistors and can operate with wide parameters.

The flip-flop network includes two transistors 27 and 28. Conductor 21 is connected through resistance 29 to the emitter 30 of transistor 27 and to the emitter 31 of transistor 28.

Conductor 22 is connected through condenser 32 with the base 33 of transistor 28.

The collector 34 of transistor 28 is connected by conductor 35 through condenser 36 to the base 37 of transistor 27.

The collector 38 of transistor 27 is connected to one end of the winding 39 of the alarm relay 40.

A conductor 41 connects the negative side of battery 42 through resistor 43 with conductor 22.

The opposite end of winding 39 of the alarm relay is connected by conductor 44 to the conductor 41.

The positive side of battery 42 is connected by conductor 45 through relay contacts 46 to conductor 21.

A high impedance millivolt circuit 47 and its calibrating resistance 48 is shown for visual determination of gas concentrations. Other resistors are placed in the flip-flop network as shown, and as will be understood by those skilled in the art.

It will be seen that when the contacts 46 are closed, the battery 42 powers the flip-flop network. This network receives and collects the pulses received via the conductors 21 and 22 from the bridge network and this holding current is used to energize the coil 39 of the alarm relay. When energized, the coil 39 holds closed the contacts 49 of the alarm relay, which keep closed a circuit through conductors 50 and 51, which control circuits to any suitable alarm and control devices. Preferably these latter include a circuit to set off an audible alarm and a circuit to break the power circuit to the mining machine.

Condenser 32 is an electrolytic condenser which partially polarizes the current going to the relay-operating network, thus making this network more sensitive to pulses of a given polarity and less sensitive to pulses of opposite polarity.

*Operation*

The control system of this invention is preferably mounted on a mining machine. When the machine is to be operated a suitable start button is pushed to cause current to flow through the coil 52 of the bridge relay 53. The bridge relay 53 is placed in the powering circuit in order to apply power to the bridge circuit at times when the detector circuit is in alarm state. Conductor 53a leads to the start button. When relay 53 is activated the contacts 54 close.

The closing of contacts 54 causes:

(a) Closing of the circuit from conductor 18, through the blocking oscillator 19 and bridge 10 to conductor 17, thus powering the bridge circuit.

(b) Sends current through coil 55 of relay 56, which closes contacts 46, thus powering the flip-flop network 23 from battery 42.

After the current going from the bridge to the relay-operating network drops a certain small amount (due to the heating of filament 11 by the presence of methane) the current in the flip-flop network drops, coil 39 is no longer able to hold the contacts 49 closed, and the opening of these contacts causes operation of the alarm devices by secondary relays, not shown.

*Advantages*

Due to the novel construction and arrangement of parts, the system of this invention has a number of advantages, which include:

(1) The system is extremely sensitive to the presence of small amounts of methane. The alarm will operate on a differential of from 2 to 3 mv. in the current coming from the bridge, whereas previous devices (usually using a magnetic type of visual meter) require a differential of 50 mv.

(2) No re-set mechanism is required within the alarm device. This is because the flip-flop network 23 is monostable and therefore returns to zero signal condition when no power is received from the bridge network.

(3) It is vibration proof, since it does not use delicate moving or electronic parts.

(4) It is relative inexpensive.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A methane alarm and control system, in combination, comprising:

a blocking oscillator circuit which receives direct current and changes it into pulsating current;

a hot-wire electrical bridge circuit including a detector filament sensitive to the presence of a noxious gas;

circuit means coupling said blocking oscillator to said bridge circuit;

a flip-flop network having an input and an output, the input being coupled to said bridge circuit to receive current pulses;

relay means responsive to the output of said flip-flop network for controlling an alarm circuit;

said detector filament being at times subjected to a fresh air condition, and operative to cause said pulsating current to be of sufficient strength to maintain said relay means energized, said detector filament at other times being subjected to noxious gas to cause reduced strength of the pulsating current causing said relay means to be de-energized.

2. A device as specified in claim 1 in which the bridge circuit is provided with adjustable means normally positioned to cause the bridge circuit to be in unbalanced condition when the detector filament is in fresh air condition, the parts being so constructed and arranged that the bridge circuit tends toward balanced condition when the detector filament is subjected to a noxious gas.

3. A device as specified in claim 1 in which the flip-flop network is a monostable pulse-operated network.

References Cited in the file of this patent

UNITED STATES PATENTS

| | | |
|---|---|---|
| 1,953,244 | Luckey et al. | Apr. 3, 1934 |
| 2,152,439 | Miller | Mar. 28, 1939 |
| 2,658,819 | Formwalt | Nov. 10, 1953 |